United States Patent [19]

Grundy

[11] Patent Number: 4,830,816
[45] Date of Patent: May 16, 1989

[54] GETTER TRAP FOR REMOVING HYDROGEN AND OXYGEN FROM A LIQUID METAL

[75] Inventor: Brian R. Grundy, Greensburg, Pa.

[73] Assignee: Westinghouse Electric Corp., Pittsburgh, Pa.

[21] Appl. No.: 107,736

[22] Filed: Oct. 13, 1987

[51] Int. Cl.⁴ .............................................. G21C 19/30
[52] U.S. Cl. ..................................... 376/313; 55/159; 75/66; 266/227; 376/312
[58] Field of Search ............... 376/310, 312, 313, 314; 210/660, 679; 55/159; 75/66; 266/227; 423/210.5

[56] References Cited

U.S. PATENT DOCUMENTS

| | | | |
|---|---|---|---|
| 2,276,560 | 3/1942 | Bird | 210/660 |
| 2,879,157 | 3/1959 | Batutis et al. | 376/312 |
| 3,454,502 | 7/1969 | Hiltgen et al. | 210/679 |
| 3,552,485 | 1/1971 | Le Jannou et al. | 376/312 |
| 3,622,303 | 11/1971 | Hill | 75/66 |
| 3,853,504 | 12/1974 | Buscher et al. | 376/312 |
| 3,853,700 | 12/1974 | Armijo | 176/38 |
| 3,963,826 | 6/1976 | Anderson et al. | 376/314 |
| 3,993,453 | 11/1976 | Ross et al. | 29/191.2 |
| 4,021,234 | 5/1977 | Nei et al. | 75/66 |
| 4,065,352 | 12/1977 | Iwano et al. | 176/68 |
| 4,088,533 | 5/1978 | McGuire | 176/37 |
| 4,229,260 | 10/1980 | Johnson et al. | 176/82 |
| 4,291,865 | 9/1981 | Grundy | 266/227 |
| 4,312,669 | 1/1982 | Boffito et al. | 75/177 |
| 4,564,509 | 1/1986 | Shealy et al. | 423/210.5 |
| 4,581,200 | 4/1986 | Himeno | 376/312 |

FOREIGN PATENT DOCUMENTS 2490864  3/1982  France ............... 376/312

Primary Examiner—Deborah L. Kyle
Assistant Examiner—Richard W. Wendtland

[57] ABSTRACT

A getter trap to remove hydrogen and oxygen from a liquid metal, such as liquid sodium, includes an elongated, closed housing having an inlet at one end thereof and an outlet at the other end. A getter material is randomly diposed within the housing comprising a zirconium-containing substrate of hollow, tubular sections having a coating thereon of a gettering alloy of zirconium, vanadium and iron. As a liquid metal flows through the inlet into the housing and through the getter material, and is discharged from the housing through the outlet, hydrogen and oxygen impurities are removed from the liquid metal. The getter trap is particularly useful in an improved liquid metal cooled nuclear reactor system.

15 Claims, 3 Drawing Sheets

GETTER TRAP FOR REMOVING HYDROGEN AND OXYGEN FROM A LIQUID METAL

BACKGROUND OF THE INVENTION

The invention relates to a getter trap for removing hydrogen and oxygen from liquid metal, such as sodium, and, more particularly, to such a getter trap for removing hydrogen and oxygen impurities from the liquid metal coolant of liquid metal nuclear reactors.

Liquid metal nuclear reactor systems typically include primary and secondary liquid metal coolant loops. The primary liquid metal coolant, such as sodium, is heated as it passes through the nuclear core of the liquid metal nuclear reactor, and is subsequently cooled by indirect heat exchange with the secondary liquid metal coolant in a heat exchanger. Liquid metal circulating in the secondary coolant loop then passes through a second heat exchanger wherein the thermal energy from the secondary liquid metal coolant is used to heat water flowing in a third loop to produce steam, which, in turn, is used to drive an electricity generating device, such as an electrical generator.

The secondary liquid metal coolant often contains undesired hydrogen and oxygen. The primary system also contains oxygen and hydrogen from the types of sources such as oxygen-bearing impurity gases in the argon or other cover gas, and the "dirt burden" on the surface of materials of construction. Hydrogen, such as that produced by corrosion in the third loop, passes into the secondary liquid metal coolant through the second heat exchanger. A typical hydrogen load in a secondary liquid sodium coolant loop in a 300 Megawatt power liquid metal nuclear reactor is 5432 kilograms of hydrogen per 30 years. Oxygen impurities are produced at a lesser rate than hydrogen impurities are produced. Thus, the secondary coolant loop often includes a means to eliminate the undesired hydrogen and oxygen from the secondary liquid metal coolant.

One method of removing the hydrogen and oxygen impurities from liquid metal is the use of a cold trap. Cold trapping action depends upon the decreasing solubility of impurities with decreasing temperature. In a typical cold trap, a liquid metal system is cooled as it passes through a subsidiary system which includes a vessel where the impurities are precipitated and held as solid phases.

In a conventional cold trap, the liquid metal enters the top of the trap from a heat exchanger and flows downwardly through the outer annulus, or "downcomer". The flow direction reverses at the bottom of a cylindrical volume packed with mesh. The liquid metal then flows upwardly through the cylinder and out through the end of the cylinder to an exit pipe. In general, nucleation of precipitate, and subsequent growth thereof, occur largely on the coldest surfaces of the cold trap. Typically, the coldest sections of cold traps are the bottom of the cold trap, the outer vessel wall, and the extended surface of the inlet section of mesh. The nucleation of precipitate and subsequent growth of the nuclei throughout these areas of the cold trap eventually restrict the flow path of the liquid metal through the cold trap and the cold trap is plugged even though only a small portion of the cold trap is filled with impurities. I disclosed a cold trap in my U.S. Pat. No. 4,291,865, which issued Sept. 29, 1981 to the assignee of the subject invention having a radial design for removing impurities, such as oxygen, from a liquid metal.

U.S. Pat. No. 3,853,700 discloses a trap for carbon in liquid sodium that utilizes binary alloys of iron and from 0.5 to 30 weight percent of titanium, from 0.5 to 25 percent vanadium, or from 0.5 to 5 percent manganese.

U.S. Pat. No. 3,993,453 relates to a getter trap of a composite with a substrate of a metal having a large coefficient of thermal expansion, such as nickel or nickel alloy, having a coating, which fractures upon heating, of zirconium or zirconium alloy for a nuclear fuel element.

Getter traps have also been used to absorb hydrogen from liquid alkali metals. U.S Pat. No. 3,622,303 relates to such a getter comprised of a barrier of a first layer of iron, nickel, tantalum, columbium and their alloys, and a second layer of palladium, platinum and their alloys.

U.S. Pat. No. 4,312,669 describes a gettering alloy for gases which include oxygen and hydrogen that is selected from the group consisting of an alloy of zirconium, vanadium and iron, whose composition, in weight percent, when plotted on a ternary diagram, lies within a triangle having as its corners the points defined by:

(a) 75 percent zirconium, 20 percent vanadium and 5 percent iron;
(b) 45 percent zirconium, 20 percent vanadium and 35 percent iron;
(c) 45 percent zirconium, 50 percent vanadium and 5 percent iron.

The disclosure of U.S. Patent No. 4,312,669 is incorporated by reference herein.

SUMMARY OF THE INVENTION

The present invention provides a getter trap to remove hydrogen and oxygen from a liquid metal, such as sodium. The getter trap includes an elongated, closed housing having an inlet at one end thereof and an outlet at the other end. A getter material is randomly disposed within the housing comprising a zirconium-containing substrate of hollow, tubular sections having a coating thereon of a gettering alloy of zirconium, vanadium and iron, whose composition, in weight percent, when plotted on a ternary diagram, lies within a triangle having as its corners the points defined by:

(a) 75 percent zirconium, 20 percent vanadium and 5 percent iron;
(b) 45 percent zirconium, 20 percent vanadium and 35 percent iron; and
(c) 45 percent zirconium, 50 percent vanadium and 5 percent iron.

Thus, as the liquid metal flows through the inlet into the housing and through the getter material, and is discharged from the housing through the outlet, hydrogen and oxygen impurities are removed from the liquid metal.

The getter trap can include a second getter material comprising pellets of the gettering alloy.

The invention provides a getter trap useful for the absorption of both hydrogen and oxygen that is effective at a temperature of 310° C. or higher, which is typical of the temperature of liquid metal coolant passing through the secondary loop of a liquid metal nuclear reactor system. Thus, additional heat exchange to further cool and heat the liquid metal is not required, since it is not required to maintain a precise temperature for successful operation.

The performance of the getter trap of the invention is not significantly affected by changes in temperature or flow performance.

The invention further provides a getter trap utilizing a getter material which allows for a hydrogen loading of the zirconium-containing substrate to the theoretical maximum corresponding to the chemical formula $ZrH_{1.3}$. Typical cold traps allow for hydrogen loading of less than half the theoretical maximum. When the auxiliary equipment associated with a cold trap and the different hydrogen density in the solid hydrogen-bearing phases in cold trap and getter trap are taken into account, the volume of the getter trap is about half that for a typical cold trap for the same hydrogen absorption capacity.

The getter trap of the invention is particularly useful in a liquid metal cooled nuclear reactor system having a primary coolant loop, a secondary coolant loop, and a third coolant loop. The primary coolant loop includes a primary liquid metal coolant, a liquid metal nuclear reactor and a first heat exchanger. The primary liquid metal coolant flows through the liquid metal nuclear reactor, the first heat exchanger, and back to the liquid metal nuclear reactor. The secondary coolant loop includes a secondary liquid metal coolant, the first heat exchanger and a second heat exchanger, wherein heat from the primary liquid metal coolant of the primary coolant loop is transferred to the secondary liquid metal coolant through the first heat exchanger. The secondary liquid metal coolant flows through the first heat exchanger, the second heat exchanger, and back to the first heat exchanger. The third coolant loop includes a water coolant, the second heat exchanger and a steam driven device, wherein heat from the secondary liquid metal coolant of the secondary liquid metal coolant loop is transferred to the water coolant through the second heat exchanger. The water coolant flows through the second heat exchanger, the steam driven device and back to the second heat exchanger. A getter trap of the invention is disposed in at least one of the primary and secondary coolant loops.

BRIEF DESCRIPTION OF THE DRAWINGS

These and other objects, features and advantages of the subject invention will become more fully apparent from the following detailed description and accompanying drawings in which.

DETAILED DESCRIPTION OF THE PREFERRED EMBODIMENTS

Figure 1:
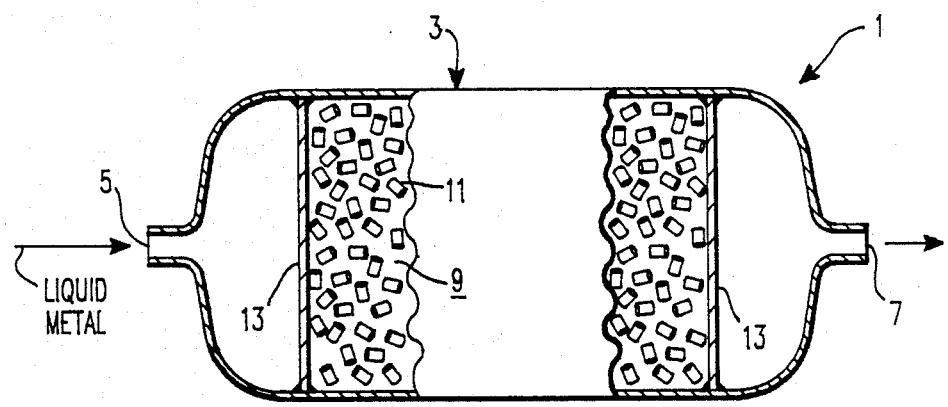
FIG. 1 is a partial sectional view of the getter trap of the invention.

The getter trap 1 (FIG. 1) of the present invention includes an elongated, closed housing 3 having an inlet 5 at one end thereof and an outlet 7 at the other end.

Figure 2:
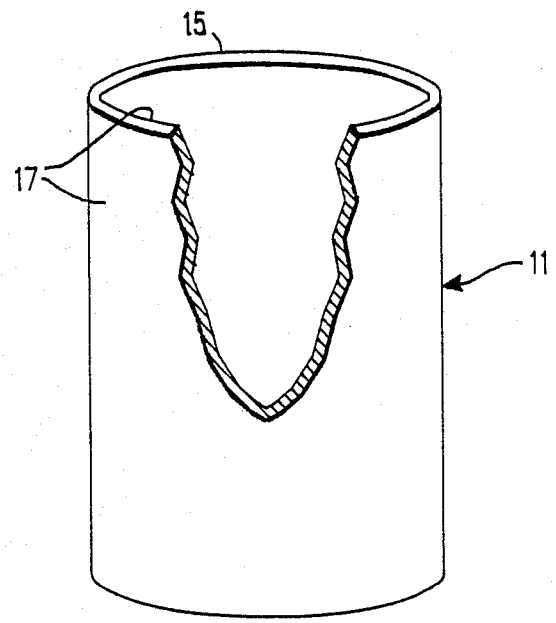
FIG. 2 is a perspective view, partly in section, of a getter material used in the getter trap of the invention.

A getter material 9 (FIG. 2) is randomly disposed within the housing 3. The getter material 9 is in the form of hollow, tubular sections 11, which are held in place within the housing 3 by a pair of baffle plates 13. The tubular sections 11 have a zirconium-containing substrate 15, formed of a material such as Zircaloy-2, which is an alloy 1.2 to 1.7 percent tin, 0.07–0.20 percent iron, 0.05–0.15 percent chromium, 0.03–0.08 percent nickel, and the balance zirconium; or Zircaloy-4, which is an alloy 1.2 to 1.7 percent tin, 0.12–0.18 percent iron, 0.05–0.15 percent chromium, and the balance zirconium. Zircaloy-4 tubes having a length of 1 inch, and outer diameter of 0.375 inch, and a wall thickness of 0.023 inch are particularly useful in the getter material 9 for the getter trap 1 of the invention.

Figure 3:
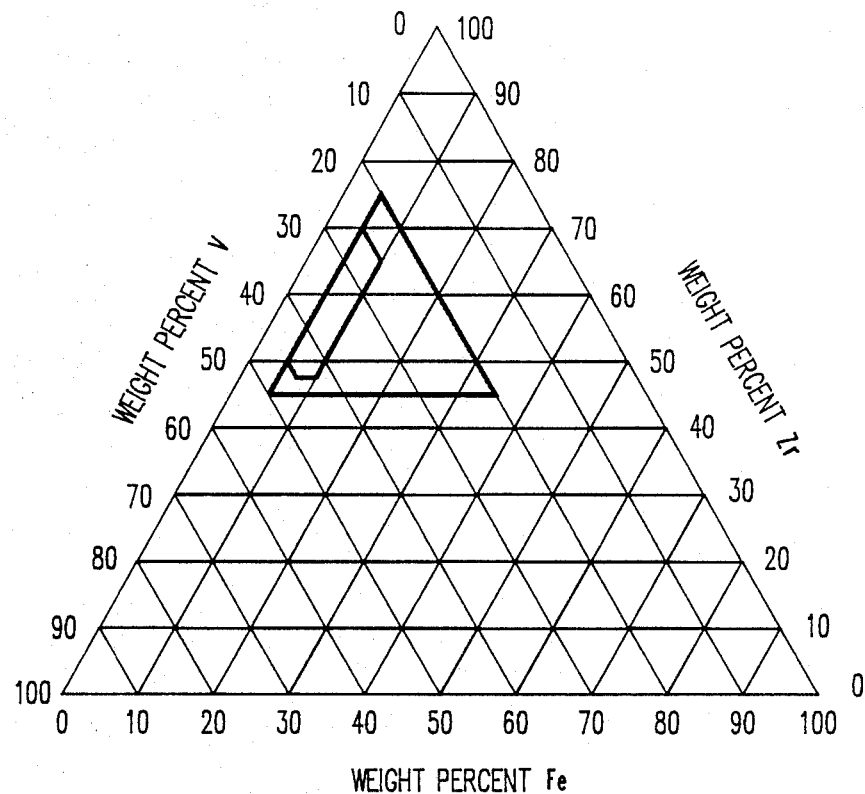
FIG. 3 is a ternary diagram showing the composition of the gettering alloys useful as a coating on the zirconium-containing substrate of the getter material of the getter trap of the invention.

The hollow, tubular sections 11 are coated with a coating 17 of the gettering alloy disclosed in U.S. Pat. No. 4,312,669 of zirconium, vanadium and iron, whose composition, in weight percent, when plotted on a ternary diagram (FIG. 3), lies within a triangle having as its corners the points defined by:

(a) 75 percent zirconium, 20 percent vanadium and 5 percent iron;

(b) 45 percent zirconium, 20 percent vanadium and 35 percent iron; and (c) 45 percent zirconium, 50 percent vanadium and 5 percent iron. Preferably, the composition of the gettering alloy, when plotted on the ternary diagram of FIG. 3 lies within a polygon having as its corners the points defined by:

(d) 70 percent zirconium, 25 percent vanadium and 5 percent iron;

(e) 70 percent zirconium, 24 percent vanadium and 6 percent iron; and (f) 66 percent zirconium, 24 percent vanadium and 10 percent iron.

(g) 47 percent zirconium, 43 percent vanadium and 10 percent iron;

(h) 47 percent zirconium, 45 percent vanadium and 8 percent iron; and (i) 50 percent zirconium, 45 percent vanadium and 5 percent iron.

One particularly suitably gettering alloy has a composition of 45 percent zirconium, 50 percent vanadium and 5 percent iron. Tubes of Zircaloy-4 coated with this gettering alloy are available from SAES Getters S.p.A. as SAES alloy type ST123.

The gettering alloy has a porous structure, and consequently, has a high surface area and a high rate of absorption for both oxygen and hydrogen. In addition, the gettering alloy has a high coefficient of diffusion for both hydrogen and oxygen. Thus, the oxygen absorbed by the gettering alloy diffuses from the surface of the getter material 9 into the bulk of the getter material 9 instead of forming a hydrogen absorption-inhibiting oxide film on the surface of the getter material 9.

Access by hydrogen to the zirconium-containing substrate when not coated with the gettering alloy is normally greatly inhibited by the formation of tightly adherent chemical films of the oxide and nitride of zirconium. The coating 17 of the gettering alloy on the surface of the getter material 9 allows the hydrogen to gain access to the zirconium-containing substrate 15. This provides a higher density of hydrogen loading than would the gettering alloy alone, because of the higher density of zirconium in the zirconium-containing substrate than in the porous gettering alloy, and because of the higher chemical affinity of the zirconium-containing substrate for hydrogen in comparison with the gettering alloy. The chemical thermodynamic properties of the zirconium-containing substrate predominate, and at high hydrogen loading, these properties are more advantageous than those of the gettering alloy. For instance, the getter material of the invention will operate at a temperature that is typical of the secondary liquid metal coolant in the secondary coolant loop of a liquid metal nuclear reactor after the secondary coolant has been cooled y passage through the second heat exchanger.

As a liquid metal, such as liquid sodium, flows through the inlet 5 into the housing 3 and through the getter material 9, and is discharged from the housing 3 through the outlet 7, hydrogen and oxygen impurities are removed from the liquid metal. The distribution of absorbed hydrogen and oxygen decreases exponentially from the inlet 5 along the length of the getter trap 1. If sufficiently large amounts of oxygen are absorbed, then a proportion of the upstream getter material 9 could have reduced effectiveness and capacity for simultaneous hydrogen absorption. Thus, these considerations can be taken into account in designing the getter trap 1, with an upstream section of getter material 9 being in effect sacrificed for oxygen removal.

The absorption of hydrogen by the gettering alloy is reversible by heating the getter material 9 to a temperature on the order of 700° C. The absorption of oxygen by the gettering alloy is not reversible. Thus, the design of a getter trap 1 must take into consideration the life expectancy of the getter material 9 due to oxygen absorption, based upon the environment in which the particular getter trap 1 is to be used.

The getter trap 1 of the invention can include a second getter material 21 comprising pellets 27 of the gettering alloy. Such a second getter material 21 is available from SAES Getters S.p.A. as SAES alloy type ST172.

Figure 4:
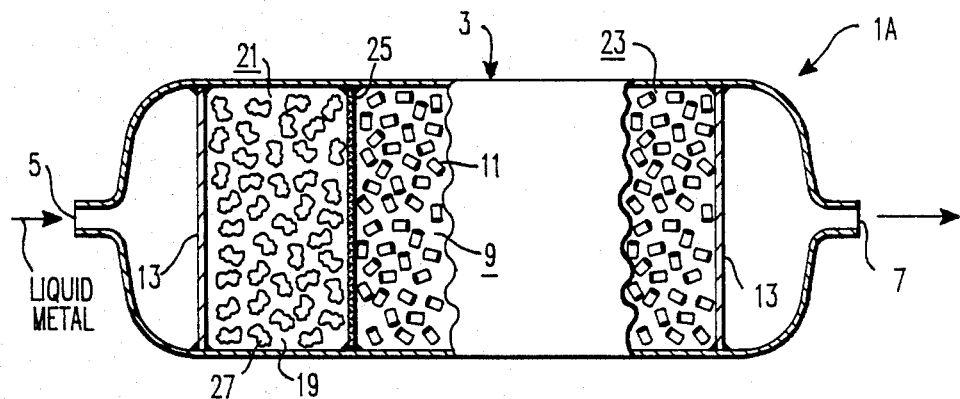
FIG. 4 is a sectional view of a second embodiment of the getter trap of the invention.

Thus, in a second embodiment of the invention, illustrated in FIG. 4, the housing 3 of the getter trap 1A includes a first section 19 in which a second getter material 21 is randomly disposed. The getter material 9 is randomly disposed in a second section 23, located downstream of the first section 19. The first section 19 and second section 23 of the housing 3 are preferably separated by means, such as a baffle plate 25. The upstream, second getter material 21 operates primarily as an oxygen getter, enabling the getter material 9, located downstream of the second getter material 21, to operate primarily as a hydrogen getter without interference from oxygen being absorbed by the getter material 9.

Figure 5:
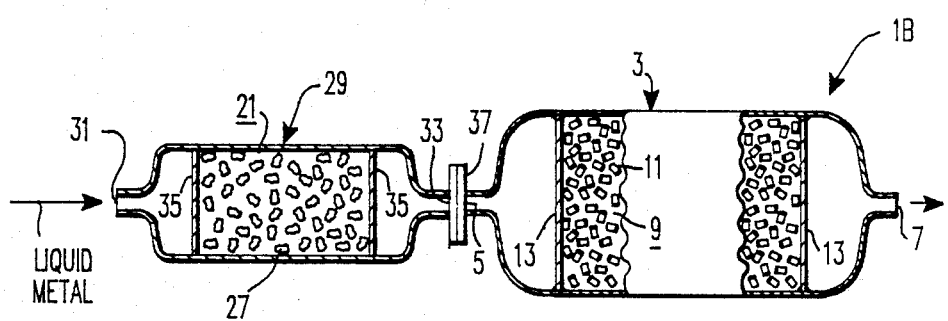
FIG. 5 is a sectional view of a third embodiment of the getter trap of the invention.

Alternatively, in a third embodiment of the invention, illustrated in FIG. 5, in getter trap 1B, the second getter material 21 is randomly disposed in a second housing 29, located directly upstream of the housing 3 in which the getter material 9 is randomly disposed. The second housing 29 includes an inlet 31 and an outlet 33. The second getter material 21 is held in place within the second housing 29 by a pair of baffle plates 35. A connection 37 secures the outlet 33 of the second housing 29 and the inlet 5 of the first housing 3 togeter. Thus, the liquid metal containing hydrogen and oxygen impurities flows into the getter trap 1B through the inlet 31 of the second housing 29, flows through the second getter material 21, and out of the second housing 29 through the outlet 33. The liquid metal then flows through the inlet 5, flows through the getter material 9, and out of the getter trap 1B through the outlet 7 of the housing 3.

These embodiments of the getter trap are expected to be particularly useful in the secondary coolant loop of a liquid metal cooled nuclear reactor, where the oxygen load is small compared to hydrogen load arising from corrosion of the steam-containing third loop.

Figure 6:
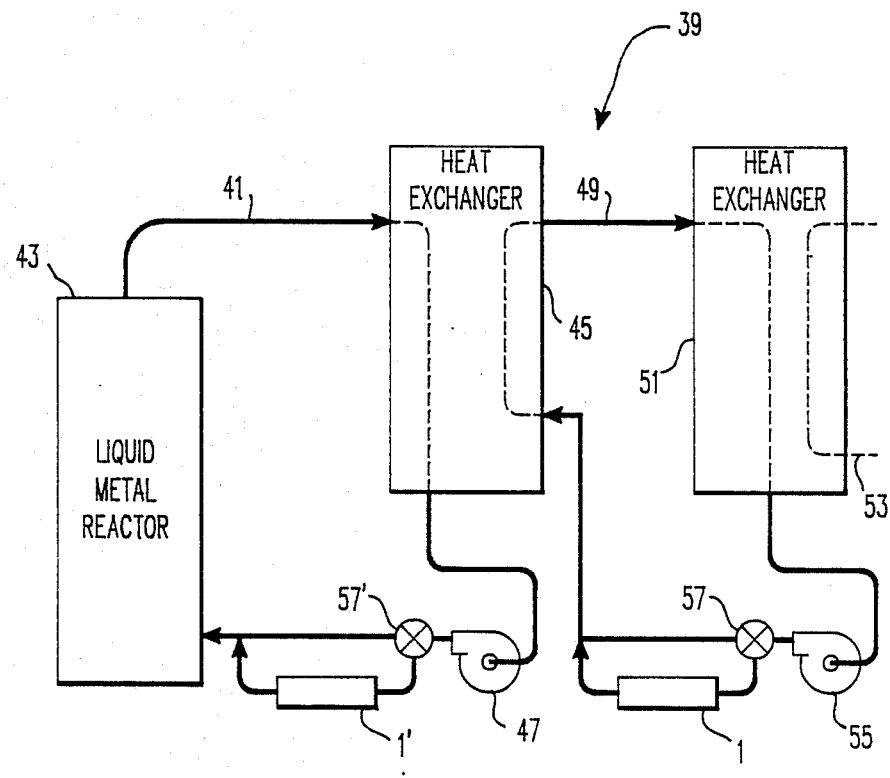
FIG. 6 is a schematic view of a liquid metal nuclear reactor system, including the getter trap of the invention.

The getter trap 1 of the invention is particularly useful in a liquid metal cooled nuclear reactor system 39 (FIG. 6). The system 39 includes a primary coolant loop 41 wherein the primary coolant, a liquid metal such as liquid sodium, is heated as it passes through the nuclear core of the liquid metal nuclear reactor 43. The primary liquid metal coolant is then cooled by passing through a first heat exchanger 45, and is directed back to the reactor 43 by a pump 47. Liquid metal coolant, circulating in a secondary coolant loop 49, absorbs thermal energy from the primary liquid metal coolant through indirect heat exchange in the first heat exchanger 45. The heated secondary liquid metal coolant then passes through a second heat exchanger 51 wherein the thermal energy from the secondary liquid metal coolant is used to heat water flowing in a third loop 53 to produce steam, which, in turn, is used to drive a steam driven device (not shown), such as an electrical generator. The secondary liquid metal coolant is then directed from the second heat exchanger 51 back to the first heat exchanger 45 by a pump 55.

The secondary liquid metal coolant often contains undesired hydrogen from the water used to operate the steam driven device, and oxygen from other sources. Thus, the secondary coolant loop 49 includes a getter trap 1, preferably in the embodiments illustrated in FIGS. 4 and 5, of the invention downstream of the second heat exchanger 51 to eliminate the undesired hydrogen and oxygen from the secondary liquid metal coolant. Flow to the getter trap 1 is controlled by a valve 57. It is easily understood that the getter trap of the invention can be used in the primary coolant loop in situations where the primary coolant includes hydrogen and oxygen contaminants. In the primary coolant loop, containing undesired hydrogen and oxygen, the getter trap 1' would be included, following a valve 57', preferably in the line between the pump 47 and the liquid metal reactor 43.

The insensitivity of the getter trap to the temperature of operation would also, alternatively, allow the same to be placed in the hot inlet line to the heat exchanger 45 of the primary coolant loop 41, or in the hot inlet line to the heat exchanger 51 of the secondary coolant loop 49.

What is claimed is:

1. A getter trap to remove hydrogen and oxygen from a liquid metal comprising:
   an elongated, closed housing having an inlet at one end thereof and an outlet at the other end;
   a getter material randomly disposed within said housing, said getter material comprising a zirconium-containing substrate of hollow, tubular sections having a coating thereon of a gettering alloy of zirconium, vanadium and iron, wherein the substrate has a higher zirconium density than does the gettering alloy, whose composition, in weight percent, when plotted on a ternary diagram, lies within a triangle having as its corners the points defined by:
   (a) 75 percent zirconium, 20 percent vanadium and 5 percent iron;
   (b) 45 percent zirconium, 20 percent vanadium and 35 percent iron; and (c) 45 percent zirconium, 50 percent vanadium and 5 percent iron;

whereby, as a liquid metal flows through said inlet into said housing and through said getter material, and is discharged from said housing through said outlet, hydrogen and oxygen impurities are removed from the liquid metal.

2. The getter trap of claim 1 wherein said liquid metal is liquid sodium.

3. The getter trap of claim 1 wherein said getter trap includes a second getter material comprising pellets of said gettering alloy.

4. The getter trap of claim 3 wherein said second getter material is randomly disposed in said housing upstream of said getter material.

5. The getter trap of claim 3 wherein said getter trap includes a second housing upstream of said housing, said second getter material being randomly disposed in said second housing.

6. A liquid metal cooled nuclear reactor system comprising:

a primary coolant loop including a primary liquid metal coolant, a liquid metal nuclear reactor and a first heat exchanger wherein said primary liquid metal coolant flows through said liquid metal nuclear reactor, said first heat exchanger, and back to said liquid metal nuclear reactor;

a secondary coolant loop including a secondary liquid metal coolant, said first heat exchanger and a second heat exchanger wherein heat from said primary liquid metal coolant of said primary coolant loop is transferred to said secondary liquid metal coolant through said first heat exchanger, and said secondary liquid metal coolant flows through said first heat exchanger, said second heat exchanger, and back to said first heat exchanger; and a third coolant loop including a water coolant, said second heat exchanger and a steam driven device wherein heat from said secondary liquid metal coolant of said secondary liquid metal coolant loop is transferred to said water coolant through said second heat exchanger, and said water coolant flow through said second heat exchanger, said steam driven device and back to said second heat exchanger;

a getter trap, disposed in at least one of said primary and said secondary coolant loops, being capable of removing hydrogen and oxygen from said liquid metal flowing in said loops and comprising:

an elongated, closed housing having an inlet at one end thereof and an outlet at the other end;

a getter aterial randomly disposed within said housing, said getter material comprising a zirconium-containing substrate of hollow, tubular sections having a coating thereon of a gettering alloy of zirconium, vanadium and iron, wherein the substrate has a higher zirconium density than does the gettering alloy, whose composition, in weight percent, when plotted on a ternary diagram, lies within a triangle having as its corners the points defined by:

(a) 75 percent zirconium, 20 percent vanadium and 5 percent iron;

(b) 45 percent zirconium, 20 percent vanadium and 35 percent iron; and (c) 45 percent zirconium, 50 percent vanadium and 5 percent iron;

whereby, as said liquid metal coolant flows through said inlet into said housing and flows through said getter material, and is discharged from said housing through said outlet, hydrogen and oxygen impurities are removed from said liquid metal coolant.

7. The liquid metal cooled nuclear reactor of claim 6 wherein said liquid metal coolant in said coolant loop, in which said getter trap is disposed, is liquid sodium.

8. The liquid metal cooled nuclear reactor of claim 6 wherein said getter trap is in said second coolant loop, and said secondary liquid metal coolant flows through said first heat exchanger, said second heat exchanger, said getter trap, and back to said first heat exchanger.

9. The liquid metal cooled nuclear reactor of claim 6 wherein said getter trap includes a second getter material comprising pellets of said gettering alloy.

10. The liquid metal cooled nuclear reactor of claim 9 wherein said second getter material is randomly disposed in said housing upstream of said getter material.

11. The liquid metal cooled nuclear reactor of claim 9 wherein said getter trap includes a second housing upstream of said housing, said second getter material being randomly disposed in said second housing.

12. The liquid metal cooled nuclear reactor of claim 6 wherein said steam driven device of said third coolant loop is an electric generator.

13. The liquid metal cooled nuclear reactor of claim 6 wherein:

said liquid metal coolant in said secondary coolant loop is liquid sodium;

said getter trap is in said second coolant loop, and said liquid sodium flows in said second coolant loop through said first heat exchanger, said second heat exchanger, said getter trap, and back to said first heat exchanger; and said steam driven device of said third coolant loop is an electric generator.

14. The liquid metal cooled nuclear reactor of claim 13 wherein said getter trap includes a second getter material comprising pellets of said gettering alloy disposed upstream of said getter material.

15. The liquid metal cooled nuclear reactor of claim 6 wherein said getter trap is in said primary coolant loop.

* * * * *